(12) United States Patent
Newell et al.

(10) Patent No.: US 10,095,612 B2
(45) Date of Patent: Oct. 9, 2018

(54) STORAGE BALLOONING IN A MOBILE COMPUTING DEVICE

(75) Inventors: Craig Newell, Cambridge, MA (US); Harvey Tuch, Cambridge, MA (US); Cyprien Laplace, Grenoble (FR)

(73) Assignee: VMware, Inc., Palo Alto, CA (US)

( * ) Notice: Subject to any disclaimer, the term of this patent is extended or adjusted under 35 U.S.C. 154(b) by 787 days.

(21) Appl. No.: 13/539,314

(22) Filed: Jun. 30, 2012

(65) Prior Publication Data

US 2013/0185480 A1  Jul. 18, 2013

Related U.S. Application Data

(60) Provisional application No. 61/587,408, filed on Jan. 17, 2012.

(51) Int. Cl.
*G06F 12/02* (2006.01)
*G06F 9/455* (2018.01)

(52) U.S. Cl.
CPC ............ *G06F 12/023* (2013.01); *G06F 12/02* (2013.01); *G06F 9/45558* (2013.01); *G06F 2009/45583* (2013.01); *G06F 2212/1044* (2013.01); *G06F 2212/151* (2013.01)

(58) Field of Classification Search
CPC ....................................................... G06F 12/02
USPC ......................................................... 711/173
See application file for complete search history.

(56) References Cited

U.S. PATENT DOCUMENTS

| | | | |
|---|---|---|---|
| 7,433,951 B1 | 10/2008 | Waldspurger | |
| 7,702,843 B1 * | 4/2010 | Chen et al. | ........................ 711/6 |
| 8,195,866 B2 | 6/2012 | Ginzton | |
| 2006/0010314 A1 * | 1/2006 | Xu | ..................................... 713/2 |
| 2008/0270674 A1 | 10/2008 | Ginzton | |
| 2010/0257331 A1 * | 10/2010 | Frank | ..................... G06F 9/5077 711/166 |
| 2010/0274947 A1 * | 10/2010 | Ohta | ................... G06F 9/45558 711/6 |
| 2011/0138147 A1 * | 6/2011 | Knowles | ............... G06F 9/5016 711/170 |
| 2011/0320682 A1 * | 12/2011 | McDougall | ........... G06F 12/023 711/6 |
| 2012/0054410 A1 | 3/2012 | Vaghani et al. | |

(Continued)

OTHER PUBLICATIONS

Barr, Ken et al., "The VMware Mobile Virtualization Platform: is that a hypervisor in your pocket?", ACM SIGOPS Operating Systems Review, vol. 44, Issue 4, Dec. 2010, pp. 124-135.

*Primary Examiner* — Gautam Sain
(74) *Attorney, Agent, or Firm* — Fish & Richardson P.C.

(57) ABSTRACT

One embodiment of the present invention provides a system for managing storage space in a mobile device. During operation, the system detects a decrease in available disk space in a host file system, wherein an image file for a guest system is stored in the host file system. In response to the detected decrease, the system increases a size of a balloon file in a storage of a guest system. The system then receives an indication of a TRIM or discard communication and intercepts the TRIM or discard communication. Next, the system determines that at least one block is free based on the intercepted TRIM or discard communication. Subsequently, the system frees a physical block corresponding to the at least one block in a storage of the host system and reduces a size of the image file for the guest system in accordance with the intercepted TRIM or discard communication.

20 Claims, 6 Drawing Sheets

(56) References Cited

U.S. PATENT DOCUMENTS

| | | | |
|---|---|---|---|
| 2012/0110293 A1* | 5/2012 | Yang | G06F 9/45558 711/170 |
| 2012/0233434 A1* | 9/2012 | Starks | G06F 3/0644 711/170 |
| 2012/0233435 A1* | 9/2012 | Ben-Yehuda et al. | 711/170 |

* cited by examiner

STORAGE BALLOONING IN A MOBILE COMPUTING DEVICE

BACKGROUND

Over the past decade the mobile phone has evolved from a voice-centric device into a mobile personal computer. No longer just for telephony, the mobile phone has become a multitasking tool, useful for activities such as emailing and web browsing. The current trends for mobile phones are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device or carry two devices, one personal and one enterprise, to work.

From an end-user perspective, it is desirable to consolidate a personal mobile device with an enterprise device. Virtualization offers an opportunity to provide a convenient solution by preserving isolation of environments without requiring a second physical enterprise device. Supporting an enterprise environment on a personal mobile phone through virtualization techniques represents an attractive alternative to existing solutions involving multiple physical mobile phones. The rapid pace of hardware advances in mobile devices over the past several years has led to a class of mobile phones with resources capable of supporting a virtual machine running on a mobile phone (e.g., a "virtual phone") where the virtualization overhead is small.

VMware's Horizon Mobile platform enables enterprise management of an isolated virtual machine (VM) based environment on employee owned smartphones. This is achieved by multiplexing two phone personas, a work and a home phone, on a single mobile device via system virtualization. Such multiplexing facilitates a Bring Your Own Device (BYOD) approach to managing IT resources in an enterprise, in which an IT department can provide an employee the freedom to select their own device and provision it with a VM containing the work environment. A hypervisor and on-device management components enable the VM to be managed remotely by the enterprise, while the home environment remains under the complete control of the employee. Horizon Mobile currently employs a hosted model, in which the work VM runs as a guest on top of a host providing the home phone environment. The host has bounded storage, e.g. Android® devices typically offer two types of storage to applications:

Internal.

Internal storage includes internal NAND flash memory or embedded MultiMediaCard/Secure Digital (eMMC/eSD) chips, fixed and constrained in size due to cost and power consumption. Today, capacities typically range between 256 MB and 64 GB. The system kernel, middleware and libraries reside on internal storage as well as application code and some application data.

External.

Small form factor Secure Digital (microSD) cards are almost universally standard and provide removable mass storage (up to 32 GB) for application data. Secure Digital Extended Capacity (SDXC) cards will support up to 2 TB capacities in the future. Removable Secure Digital (SD) card storage benefits from the economies of semiconductor scaling and supply after a smart phone has been shipped and purchased.

In general, a mobile virtualization platform (MVP) such as Horizon Mobile locates VM disk images on external storage due to internal storage capacity limitations. The limited SD card space is shared between guest and host. One standard allocation method is to pre-allocate the space for the guest VM image on the host file system at VM creation time, which is a form of storage partitioning. This ensures that sufficient space is available on the host to meet the storage expectations of the guest. Unfortunately, this can result in storage resources allocated to the guest being underutilized, since space is statically reserved and unavailable to the host. Another problem with this method is that the creation of a large image may be time consuming, impacting user experience. For example, with an Android device, when creating the VM image on an SD card, the Linux FAT driver will zero each block, which may take several minutes for a multi-gigabyte VM image.

An alternative allocation method is to over-provision the system, by not reserving the complete VM image at VM creation. This is a strategy similar to that employed by VMware Workstation® and Fusion®, where the guest VM image may be broken up into multiple extents, e.g. a 100 GB VM disk image may consist of five 20 GB extents. If the guest has only modified 30 GB worth of data then only two extents need to be allocated on the host. With this strategy it is possible to exhaust storage space on the host and have a guest I/O trigger an extent allocation that fails. When disk space is exhausted, available options include suspending the guest or returning an I/O error to the guest kernel. An administrator may be required to manually resolve the failed extent allocation. The administrator can also attempt to manually adjust the size of various disk images for different VMs. This is an inefficient and ineffective approach to managing the utilization of available physical disk space between guest systems and the host.

SUMMARY

One embodiment of the present invention provides a system for managing storage space in a mobile computing device having host and guest systems that share storage resources. During operation, the host system detects a decrease in available disk space in a host file system, wherein an image file for a guest system is stored in the host file system. In response to the detected decrease, the guest system increases a size of a file in a guest file system of the guest system, wherein the file is not used by any other process in the guest system. The guest system then sends to the host system a communication to release from the image file for the guest system at least one data block corresponding to the file, thereby causing a physical block corresponding to the at least one block in a host file system to be freed and a size of the image file for the guest system to be reduced.

In a variation on this embodiment, the guest system marks a block with a predetermined content, thereby allowing the host system to free a corresponding block in the host file system.

In a further variation, the predetermined content is a zero value.

In a variation on this embodiment, the communication causes garbage collection in the host file system to eliminate extent allocations.

In a variation on this embodiment, the system increases the size of the file beyond a threshold ratio of the file size to occupied host disk space.

In a variation on this embodiment, the system increases the size of the file without initialization of one or more additional file blocks.

In a variation on this embodiment, the system performs additional steps comprising detecting an increase in available disk space in the host file system; and, in response to the increase, reducing the size of the file in the guest file system.

In a variation on this embodiment, the host file system resides on an SD card.

In a variation on this embodiment, the mobile computing device is a mobile phone with telephony support in the host system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention solve the problem of optimizing utilization of limited host disk space in an over-provisioned system by automatically increasing the size of a balloon file in a guest system in response to increased host physical disk usage. This storage ballooning facilitates opportunistic recovery of space on the host file system by taking advantage of information communicated by the guest regarding the status of blocks occupied by the balloon file.

In particular, the guest allocates a balloon file in the guest file system that expands/contracts in size as the occupied disk space in the host file system increases/decreases. The balloon file propagates pressure reflecting available disk space from the host to the guest to efficiently utilize host physical disk space. When the balloon file expands, the guest allocates disk blocks to the balloon file. The guest can issue a discard command on those blocks, or mark the blocks with a marker (e.g., a zero value), and data regarding the marked blocks are sent to the host. The host detects the marked blocks and frees the blocks. The host reduces the guest image file size accordingly. The pressure from the expanding balloon may also cause the guest file system to issue a discard command (e.g., TRIM) to delete unnecessary data. A virtual block storage device can intercept these commands, free the corresponding physical data blocks, and reduce the guest image file size. Further, an oversized balloon file can reduce the probability of storage resource exhaustion. Additionally, for older file systems, one modify the fallocate( ) system call in a file system such that it issues discard requests for allocations performed on behalf of the balloon file, allowing a virtual block storage device to free blocks as the balloon file expands. By applying the storage ballooning techniques discussed herein, it is possible to avoid VM suspension or I/O failures due to resource exhaustion.

The storage ballooning techniques discussed herein may be implemented in both the MVP hosted model and a bare-metal hypervisor scenario, with one or more guest systems. Embodiments of the invention may be implemented in any system where storage resources are shared. Although the present disclosure is presented using examples of mobile phones, embodiments of the present invention are not limited to mobile devices, and are applicable to any type of computing device, including but not limited to, desktop computers, notebook computers, netbook computers, tablets, portable multimedia players, etc.

Mobile Virtualization Platform

Figure 1:
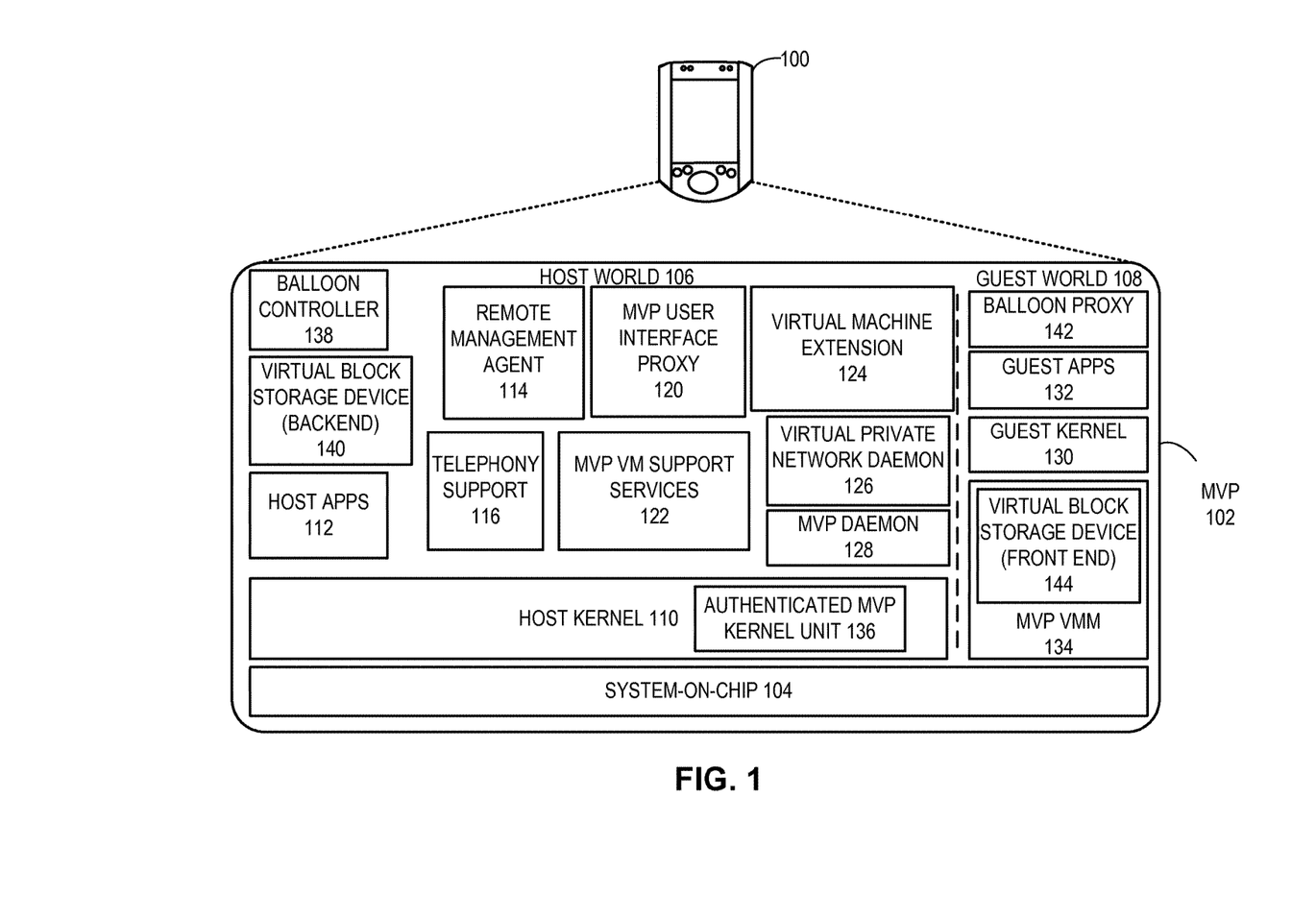
FIG. 1 illustrates an exemplary system architecture for mobile virtualization platform (MVP), in accordance with an embodiment of the present invention.

FIG. 1 illustrates an exemplary system architecture for a mobile virtualization platform (MVP), in accordance with an embodiment of the present invention. In the embodiment depicted in FIG. 1, MVP 102 is an end-to-end solution for enterprise management of employee-owned phones, encompassing an enterprise virtual mobile phone for physical mobile devices. As depicted, a physical mobile phone 100 with a system-on-chip (SoC) 104, such as an ARM-based chip, supports a variety of software components installed into phone 100 that make up MVP 102. The host operating system (e.g., Android, etc.) on phone 100 includes a host kernel 110 that runs over SoC 104. Host applications 112 run on top of the host operating system. Host applications 112 can include personal applications of the owner of phone 100. Telephony support 116 allows phone 100 to make regular telephone calls. Host kernel 110 and all applications and modules running on host kernel 110 form a "host world" 106. Host world 106 includes the user and system context, such as user files, privileged register files, and processor states.

As previously mentioned, MVP 102 includes a variety of components or modules that are installed on phone 100. In some embodiments, MVP 102 includes remote management agent 114 that allows the virtual mobile phone to be remotely managed. Remote management agent 114 can support provisioning, updating, wiping, locking and backup of virtual phones over mobile networks. In some embodiments, components of MVP 102 support the running of a guest operating system (within a virtual machine sometimes referred to herein as a "virtual mobile phone") alongside the host operating system. The guest operating system includes a guest kernel 130 which runs guest applications 132. In one embodiment, guest applications 132 include the applications associated with an enterprise, that for example employs the owner of phone 100 and provides the owner a process to install various components of MVP 102 on phone 100. Guest kernel 130 and all applications and modules running on guest kernel 130 form a "guest world" 108.

MVP user interface proxy 120 runs on the host operating system (e.g., including host kernel 110) and provides the user interface to access the virtual mobile phone. When the virtual mobile phone in MVP 102 is launched, proxy 120 allows the user interface of the guest operating system to operate. For example, in one embodiment, the host operating system of phone 100 can be Symbian while the guest operating system of the virtual mobile phone can be Android. Under such a scenario, proxy 120 of MVP 102 runs on Symbian and allows the user interface of Android to operate when the virtual mobile phone is loaded in phone 100. MVP virtual machine (VM) support services 122 provide necessary host services to the virtual phone. Virtual private network daemon 126 is responsible for establishing and maintaining a virtual private network.

MVP relies on the ability of certain components to operate in privileged modes over a native operating system. An MVP daemon 128 executes as a privileged user on the host and is responsible for granting necessary capabilities to MVP-related processes. In some embodiments, an original equipment manufacturer can place daemon 128 on phone 100. MVP daemon 128 performs integrity checks that enable a verified execution environment for the virtual phone of MVP 102. In addition, MVP daemon 128 inserts an authenticated MVP kernel unit 136 into host kernel 110, and facilitates transfer of control between host kernel 110 and MVP virtual machine monitor (VMM) 134.

During operation, when the host launches the virtual mobile phone, MVP daemon 128 loads VMM 134 into memory, and dedicates a thread to the execution of VMM 134. From the host operating system's point of view, this thread for VMM 134 represents the time spent running the virtual phone, and the processor time is divided between guest world 108 and host world 106. In host world 106, host kernel 110 and applications 112 continue to execute as before. When guest world 108 starts, MVP daemon 128 calls authenticated MVP kernel unit 136, which facilitates the switch between the worlds. VMM 134 then takes over control of phone 100, which in turn passes control to guest kernel 130. VMM 134 returns control to host world 106 on interrupts and when necessary to access host services, such as host memory allocation or making system calls on behalf of the virtual phone.

In the embodiment of FIG. 1, VMM 134 works with other MVP 102 components in host world 106, such as a virtual machine extension thread or process 124, to provide guest world 108 with a set of virtual devices, such as storage. Guest kernel 130 can include a paravirtualized guest driver for each such virtual device component. VMM 134 intercepts calls from guest drivers and forwards requests as needed to the components for device-specific behavior. Virtual machine extension thread or process 124 can also facilitate checkpointing and restoration of the virtual phone, providing an enhanced user experience via virtual phone persistence, and hides the virtual phone boot process.

Host world 106 may also include a balloon controller 138 and a virtual block storage device (backend) 140. Guest world 108 may also include a balloon proxy 142 and a virtual block storage device (front end) 144. Balloon controller 138 monitors physical disk space utilization and controls balloon proxy 142 to adjust guest usage of disk space. Virtual block storage device (front end) 144 operates in the guest system and informs virtual block storage device (backend) 140 of block allocations and deletions related to an expanding a balloon file. The operations of the various components with respect to controlling the balloon file size for adjusting guest disk usage are discussed in further detail with respect to FIG. 3.

Exemplary Storage Architecture for MVP

Figure 2:
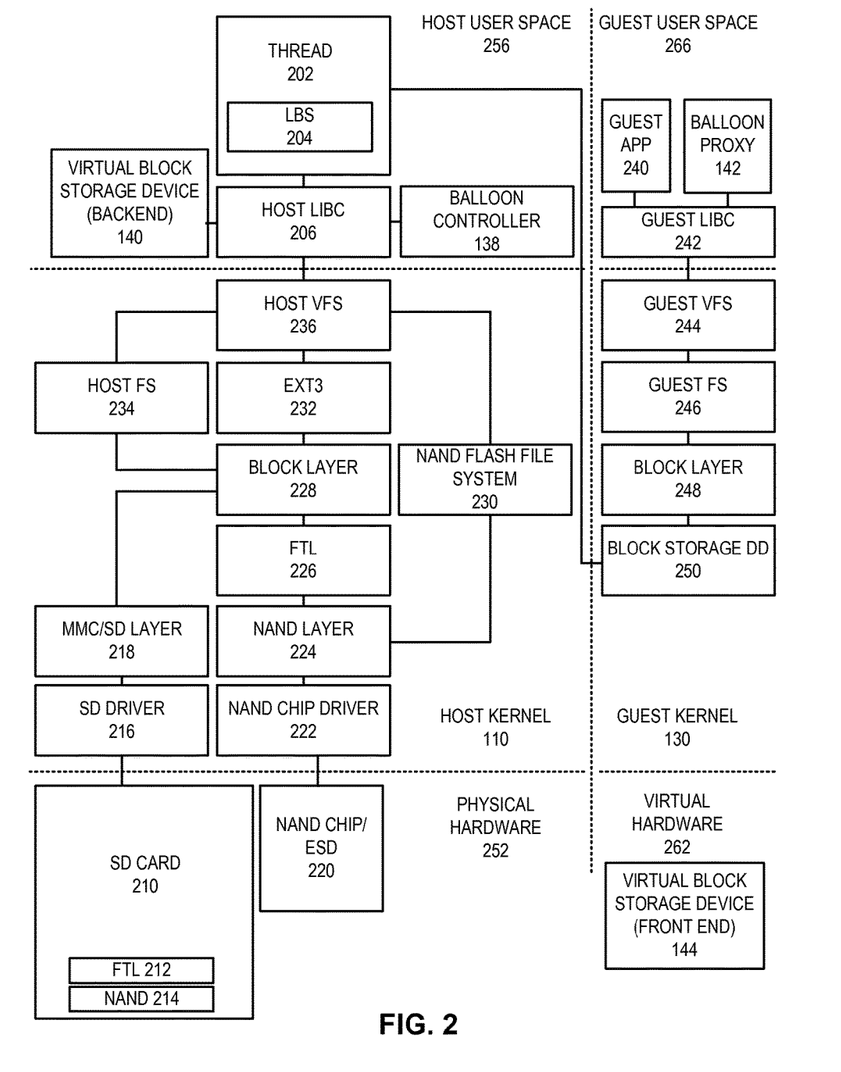
FIG. 2 illustrates an exemplary storage architecture for MVP, in accordance with an embodiment of the present invention.

FIG. 2 illustrates an exemplary storage architecture for MVP, in accordance with an embodiment of the present invention. SD card 210 contains a flash translation layer (FTL) 212 which makes flash memory of SD card 210 appear to the phone as a linearly accessible block storage device. The flash memory of SD card 210 includes arrays of NAND gates 214, which are organized by FTL 212 into a logical block structure. NAND Chip/eSD 220 is constructed with NAND gates as well.

In some embodiments, host kernel 110 of the host operating system has a NAND flash file system 230 that is used to access NAND Chip/eSD 220. In some embodiments, NAND Chip/eSD 220 can be an eMMC or an eSD card with a secured file system, such as ext3 232. The file system for SD card 210 is host FS 234, which can be FAT, ext3, ext4, or any other type of file system. In various embodiments, either the NAND flash file system 230 or ext3 232 file system can facilitate access to NAND Chip/eSD 220. A host virtual file system (VFS) 236 of host kernel 110 allows host libraries to access different types of file systems in a uniform way. With host virtual file system 236, applications or libraries can access files on the various host file systems (e.g., host file system 234 or ext3 232 or NAND flash file system 230) without modification. The actual type of the host file system is transparent to the accessing applications or libraries. In some implementations, NAND flash file system 230 is the working file system of the host and stores the host operating system.

Host libraries can include a C language library, such as a host libc 206, which may provide standard support for Linux® system calls and interfaces. The host libraries support software developed for and executing on the host operating system. FTL 226 makes linear flash memory of NAND layer 224 appear to block layer 228 like a disk drive. Block layer 228 includes a request queue and allows I/O operations on NAND Chip/eSD 220 as memory blocks. A driver 222 for the NAND chip in NAND Chip/eSD 220 executes the I/O operations on NAND chip based on activities in NAND layer 224. Similarly, in conjunction with FTL 212, block layer 228 allows I/O operations on SD card 210 as memory blocks via MMC/SD layer 218. A driver 216 for the MMC/SD card executes the I/O operations on SD card 210 based on activities in MMC/SD layer 218.

Guest kernel 130 contains a paravirtualized block storage device driver 250 (referred to as "BLOCK STORAGE DD 250" in FIG. 2), providing the front end of the virtual phone storage stack. A set of virtual hardware 262 includes a virtual storage device that provides guest kernel 130 a block oriented storage abstraction through block storage device driver 250 that communicates requests of block layer 248 in guest kernel 130 with a thread 202 supporting storage I/O executing in host user space 256. In one such embodiment, such a thread 202 is virtual machine extension thread or process 124 and implements a logging block store (LBS) 204 (explained in more details below) for the virtual mobile phone. Guest virtual file system (VFS) 244 of guest kernel 130 allows guest libraries, such as guest libc 242, to access a guest file system 246 in guest user space 266 in a uniform way. With guest virtual file system 244, applications or libraries can access files on the guest file system 246 without modification. The actual type of the guest file system 246 is transparent to the accessing application or library. In some embodiments, the guest file system is an ext3 file system or an ext4 file system.

A read or write operation by a guest application 240 requires data to be transferred between guest application memory and the physical SD card media. For example, during a write operation, the corresponding data is transferred to guest kernel 130. A virtual I/O operation is then started by a call from a paravirtualized device driver, such as block storage device driver 250. The driver provides a reference to the VMM, as described in conjunction with the embodiment FIG. 1. The VMM, in turn, provides a shared mapping to thread 202 (e.g., virtual machine extension thread or process 124 in one embodiment). The block, as identified by block layer 228, is then written to the virtual phone image file using a write operation on host kernel 110 and transferred to SD card 210.

The exemplary storage architecture for the MVP embodiment discussed with respect to FIG. 2 includes balloon controller 138, balloon proxy 142, virtual block storage device (backend) 140, virtual block storage device (front end) 144, and other components for storage ballooning. The MVP architecture can include the balloon controller 138 in the host user space. Furthermore, guest user space 266 can also include the balloon proxy 142. These components for adapting the MVP architecture for storage ballooning are further discussed with respect to FIG. 3.

In some embodiments, virtual block storage device (backend) is LBS 204 (FIG. 2). Such a logging block store is described in detail in U.S. patent application Ser. No. 13/430,175, entitled "Block Storage Virtualization on Commodity Secure Digital Cards," the entire disclosure of which is incorporated by reference herein. LBS is a type of log-structured system, which writes all modifications to a storage device sequentially in a log-like structure, thereby speeding up both write operations and crash recovery. Along with maintaining such log-like structure, embodiments of LBS also store associated metadata, which includes indexing information, so that files can be read back from the log efficiently. In addition, embodiments of LBS perform garbage collection to re-use storage space, which prevents the log file from growing infinitely. More details about log-structured file systems in general can be found in Rosenblum, Mendel and Ousterhout, John K. "The Design and Implementation of a Log-Structured File System," ACM Transactions on Computer Systems, Vol. 10 Issue 1, pp. 26-52, February 1992, which is incorporated by reference herein.

Exemplary Storage Architecture for MVP with Storage Ballooning

An adapted storage ballooning architecture for an MVP embodiment includes a balloon controller and a balloon proxy. The balloon controller and balloon proxy are user level processes running on the host and guest systems, respectively. The balloon controller monitors host physical storage utilization and instructs the balloon proxy to control the size of a balloon file on the guest in response to host storage utilization levels, as discussed below.

Figure 3:
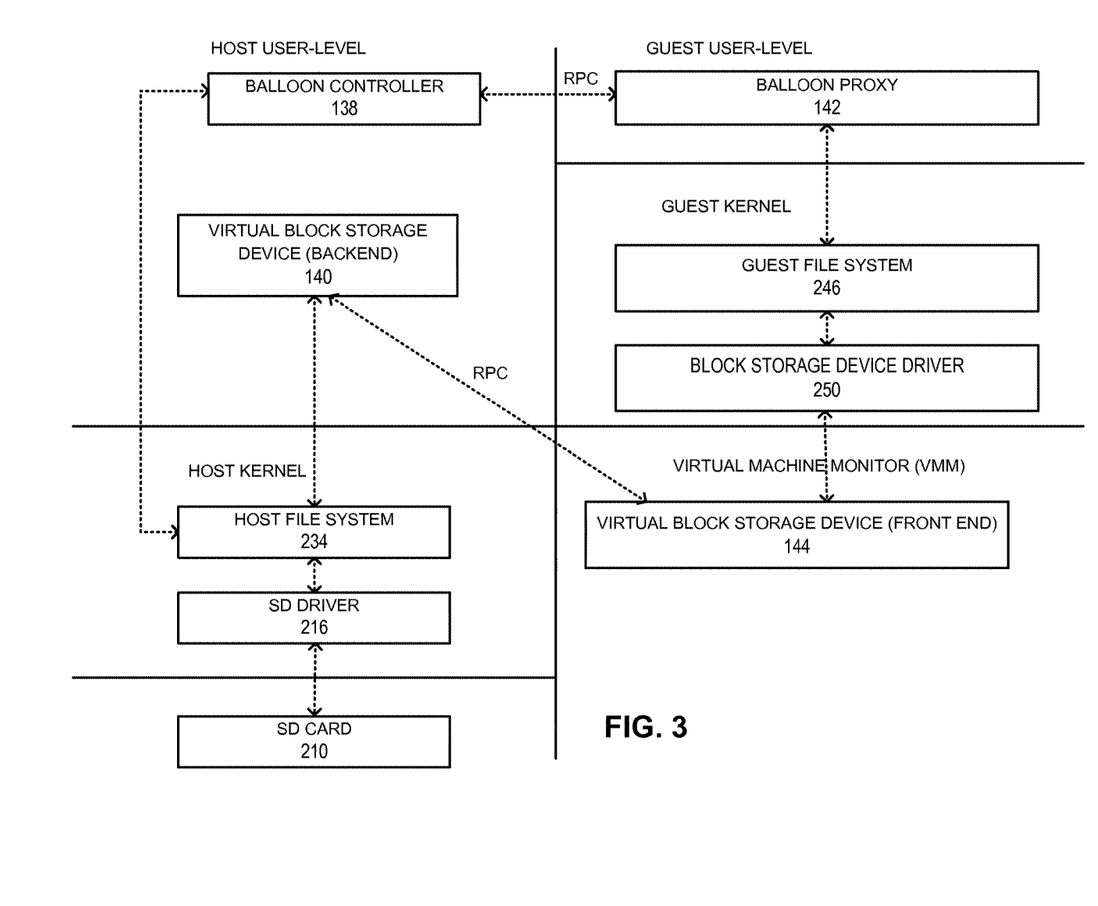
FIG. 3 illustrates an exemplary storage ballooning architecture for MVP, in accordance with an embodiment of the present invention.

FIG. 3 illustrates an exemplary storage ballooning architecture for MVP, in accordance with an embodiment of the present invention. A balloon controller 138 facilitates efficient utilization of physical disk space available in a host file system 234 (which in some embodiments works with a SD driver 216 and resides on a SD card 210). Balloon controller 138 adjusts guest disk space usage by causing the size of a balloon file implanted in a file system 246 of the guest to vary. The balloon file serves two purposes. First, the balloon file's size contributes to the guest operating system's assessment as to the availability of free disk space in the guest's virtual block storage device that is part of its virtual hardware 262 (also sometimes referred to as the guest's "virtual disk" and depicted as virtual block storage device (front end) 144 in FIG. 3). Second, when the guest allocates blocks to the inflating balloon file, the guest is, as further described by the processes below, essentially informing the host that the physical disk blocks corresponding to the allocated blocks are free.

Balloon controller 138, which runs in the host, monitors the utilization of physical disk space on the host and can communicate with a balloon proxy component, process or thread 142 running in the guest to proportionally adjust the size of the balloon file according to the occupied host physical disk space. In one embodiment, balloon controller 138 can communicate with balloon proxy 142 using RPC. Generally, the various components illustrated in FIG. 3 can communicate with each other using some hypervisor provided RPC, asynchronous notification and/or loopback network mechanism. As the occupied host physical disk space grows/shrinks, balloon controller 138 communicates the disk space change and/or instruction to inflate/deflate the balloon file to balloon proxy 142. In response, balloon proxy 142 inflates/deflates the balloon file when the occupied host disk space increases/decreases. Thus, the balloon file can expand and contract appropriately in response to the changing availability of physical disk space in the host. This creates corresponding pressure on the available storage in the guest.

Balloon controller 138 may adjust the balloon file size according to a number of different algorithms. In one embodiment, balloon controller 138 can maintain the balloon file size approximately equal to the amount of host physical disk space occupied by other than the guest's usage of storage. However, the balloon file may be limited such that the size of the balloon file does not increase beyond the size of the virtual disk. Balloon controller 138 may poll the host file system 234 for the available host disk space, either periodically or after detecting storage activity from the host file system. Further, the host may notify balloon controller 138 of low disk space, causing balloon controller 138 to adjust the balloon file size.

In one embodiment, balloon proxy 142 expands and contracts the balloon by issuing system calls to a guest file system 246, which operates with a block storage device driver 250 that interacts with a virtual block storage device (front end) 144. For example, depending on the file system and embodiment, such a system call may be a ftruncate( ) system call that increases the balloon file size by zero filling blocks in the balloon file. A virtual block storage device (backend) 140 running in the host can subsequently detect the blocks marked with zeros and free the blocks for use by applications or other components in the host. When reducing the balloon file size, ftruncate( ) can eliminate part of the balloon file in the guest without affecting the host. In certain embodiments, the balloon proxy can also issue a fallocate( ) system call, in which the guest file system provides a mechanism to reserve storage space without initialization of the file contents. The use of the fallocate( ) system call provides a mechanism to bypass zero block detection in the virtual block storage device, which may increase efficiency.

For certain guest file systems (e.g. FAT), the implementation of a zero block marking and detection technique allows the virtual block storage device (backend) 140 in the host to detect free blocks and reduce the size of the guest image file. As the balloon file inflates inside the guest, the guest file system reserves disk blocks for the balloon file. The guest file system may delete cache files or other unnecessary files in order to allocate the disk blocks. The guest writes zeros to the reserved blocks (e.g., during a ftruncate( ) system call). Virtual block storage device (front end) 144 communicates information regarding zero-filled blocks to virtual block storage device (backend) 140 in the host system, which in turn detects the zeros and frees the physical blocks on the host corresponding to the logical blocks of the guest with the zero value markings. Virtual block storage device (front end) 144 can use RPC to communicate with virtual block storage device (backend) 140 in the host system. Virtual block storage device (backend) 140 can also store metadata indicating that the associated disk blocks are filled with zeros, instead of allocating space to store the zeros. As a result, the guest image file size becomes smaller. An example of freeing zero-filled blocks allocated to a balloon file is discussed with respect to FIG. 4.

For some file systems (e.g., ext4), when a file is deleted or shrunk in the guest, the file system may issue a discard (e.g., TRIM) command. In certain embodiments, discard commands may also be issued by a daemon using a fitrim( ) system call. Generally, a TRIM command informs a solid-state drive (SSD) of unused data that can be wiped. The requests can be intercepted by the virtual block storage device and allow the hypervisor to detect the changes in guest storage requirements. The virtual block storage device may also perform garbage collection when the number of extents is reduced, and eliminate unnecessary extent allocations on the host file system. An example of intercepting a discard command to free blocks is discussed with respect to FIG. 5.

In various embodiments, the guest can include an oversized balloon file. The balloon proxy can maintain such an oversized balloon file exceeding a higher threshold ratio of balloon file size to occupied host disk space. For example, the ratio of the balloon file size to occupied host disk space can be maintained at 1.3 to 1 ratio. This reduces the probability of the guest using up nearly all available actual disk space and driving the host system close to resource exhaustion, resulting in performance anomalies. Furthermore, the guest can gradually increase the ratio of balloon file size to occupied host disk space as the available host disk space drops to threshold levels that may impact performance.

Some older file systems do not support discard requests. For such guest file systems, an additional use of storage ballooning to that described above is recovering information on free blocks in the guest. If some guest file system's system call such as ftruncate( ) fallocate( ) or ioctl( ) implementation is modified to issue discard requests for allocations performed on behalf of the balloon file, e.g. by introducing an additional flag used by the balloon proxy invocation, then the virtual block storage device will be able to free blocks as the balloon is expanded.

Virtual block storage device (backend) 140 executes as a host user-level process. Virtual block storage device (front end) 144 executes as part of the virtual machine monitor. These two components communicate with each other for zero block detection and interception of discard commands. Balloon controller 138 executes as a host user-level process. Balloon proxy 142 also executes as a guest user-level process. Communication between the various components facilitates reduction of the guest image file size.

Using Zero Block Detection to Reduce a Guest Image File Size

Figure 4:
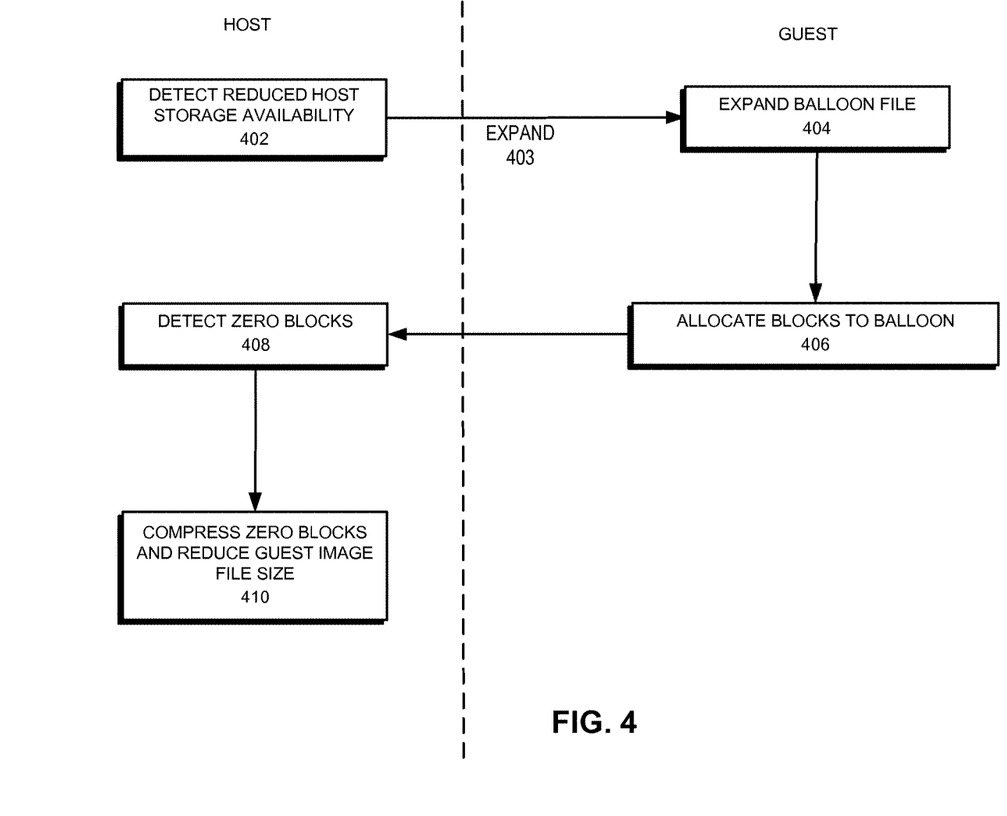
FIG. 4 presents a flowchart illustrating a process of using zero block detection to reduce a guest image file size, in accordance with an embodiment of the present invention.

FIG. 4 presents a flowchart illustrating a process of using zero block detection to reduce a guest image file size, in accordance with an embodiment of the present invention. During operation, balloon controller 138 detects reduced host storage availability (operation 402). Balloon controller 138 then issues a request to balloon proxy 142 to expand the balloon file (operation 403). In response, balloon proxy 142 expands the balloon file (operation 404).

Subsequently, the guest can allocate blocks to the balloon file (operation 406). In one embodiment, previously deleted blocks (e.g., cache files) in the guest storage can be allocated to the inflating balloon file. This causes communication between the guest and host regarding the previously deleted blocks, which the host can subsequently use to reduce the guest image file.

Next, virtual block storage device (backend) 140 receives the communication from the guest (e.g., sent by virtual block storage device (front end) 144) regarding the allocated blocks (operation 408). Virtual block storage device (backend) 140 may detect zero blocks written by the guest and free the physical blocks associated with the detected zero blocks. Virtual block storage device (backend) 140 detects the zeros but does not write the zeros to the host physical storage. Instead, the virtual block storage device (backend) 140 stores a metadata record to indicate the zeros. Thus, the guest image file's actual size actually does not increase as the balloon file expands or contracts. However, the virtual size of the balloon file from the guest's point of view appears to increase and decrease.

Virtual block storage device (backend) 140 can reduce the size of the guest image file by compressing the zero blocks (operation 410). In some implementations, to reduce the guest image file, virtual block storage device (backend) 140 may perform garbage collection. Garbage collecting may include rearranging data to smaller extent files or creating sparse files on the host.

Intercepting a Discard/TRIM Command to Reduce Guest Image File Size

Figure 5:
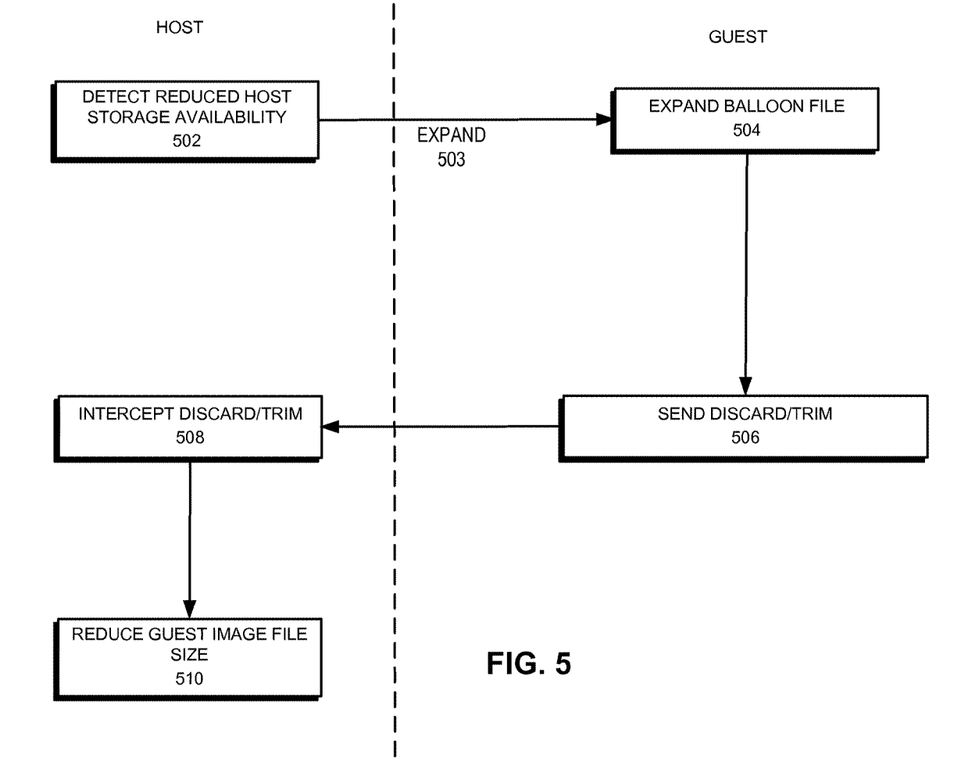
FIG. 5 presents a flowchart illustrating a process of intercepting a discard/TRIM command to reduce guest image file size, in accordance with an embodiment of the present invention.

FIG. 5 presents a flowchart illustrating a process of intercepting a discard/TRIM command to reduce guest image file size, in accordance with an embodiment of the present invention. During operation, balloon controller 138 detects reduced host storage availability (operation 502). Balloon controller 138 issues a request to balloon proxy 142 to expand the balloon file (operation 503). As a result, balloon proxy 142 expands the balloon file (operation 504). The expanded balloon file may then have discard/TRIM commands sent for the newly allocated blocks by the guest file system 246 to the physical storage (operation 506). Virtual block storage device (front end) 144 intercepts the discard command, and communicates this to virtual block storage device (backend) 140 (operation 508). In turn, virtual block storage device (backend) 140 frees the physical blocks associated with the deleted guest files and reduces the size of the guest image file based on the free physical blocks (operation 510). Note that interception of the discard/TRIM command can occur even without balloon expansion. The virtual block storage device can intercept an issued discard/TRIM command at any time.

System Architecture

Figure 6:
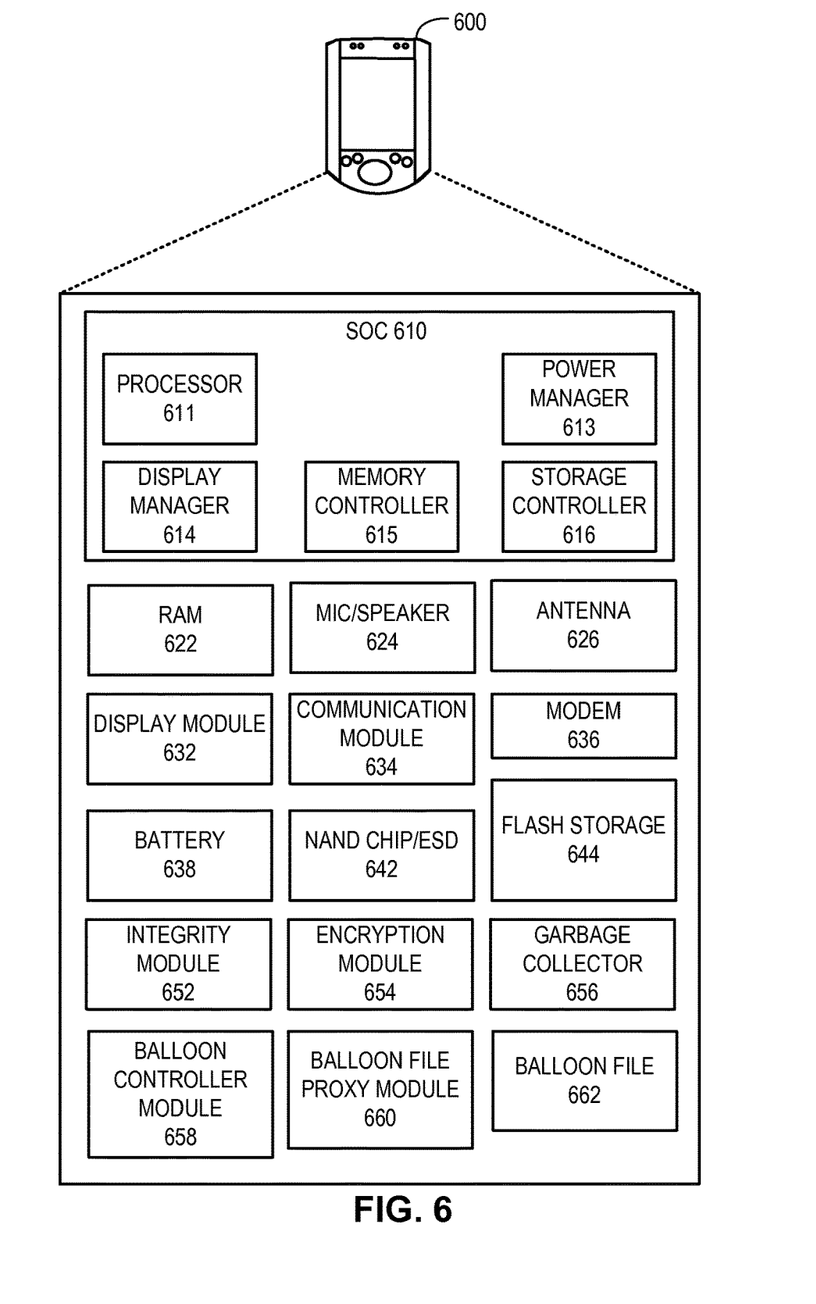
FIG. 6 illustrates an exemplary architecture of a system with storage ballooning support, in accordance with an embodiment of the present invention.

FIG. 6 illustrates an exemplary architecture of a system with storage ballooning support, in accordance with an embodiment of the present invention. System 600 includes a SoC 610 that provides the basic functionality to the system. In some embodiments, system 600 is a mobile phone. SoC 610 includes a processor 611 that executes the operations of system 600. Power manager 613 controls battery 638. Display manager 614 controls display module 632 and provides display to a user. In some embodiment, display module includes a liquid crystal display (LCD). Memory controller 615 allows processor 611 to access random access memory (RAM) 622. Storage controller 616 provides accesses to NAND Chip/eSD and flash storage device of system 600.

Microphone/speaker module 624 allows a user to perform regular voice operations. Communication module 634 uses antenna 626 and modem 636 to connect to a telephone network. System 600 includes a NAND Chip/eSD storage 642 and a flash storage device 644. Flash storage device 644 is an example of SD card 210. In some embodiments, NAND Chip/eSD storage 642 can be a NAND flash memory chip. In some further embodiments, NAND Chip/eSD storage 642 can be an eMMC or an eSD card with a secured file system, such as ext3. Integrity module 652 performs integrity checks on NAND Chip/eSD storage 642 and flash storage 644. Encryption module 654 encrypts memory blocks on NAND Chip/eSD storage 642 and flash storage 644. Garbage collector 656 frees memory blocks and makes them available for writes. A balloon controller module 658 controls a balloon proxy module 660 to adjust the size of a balloon file 662. Balloon controller module 658 is an example of the balloon controller 138 (FIG. 1). Balloon proxy module 660 is an example of balloon proxy 142 (FIG. 1).

Note that the above-mentioned modules can be implemented in hardware as well as in software. In some embodiments, one or more of these modules can be embodied in computer-executable instructions stored in a memory which is coupled to one or more processors in system 600. When executed, these instructions cause the processor(s) to perform the aforementioned functions.

In summary, embodiments of the present invention provide a system and a method for maximizing utilization of limited host disk space in an over-provisioned system by automatically increasing the size of a balloon file in a guest system in response to increased host physical disk usage. In one embodiment, during operation, the system expands a balloon file in the guest file system and frees detected zero-filled blocks allocated to the balloon file. The system also intercepts discard commands to free physical blocks associated with deleted files.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for managing storage space in a mobile computing device having a host system and a guest system that share storage resources, comprising:
   detecting a decrease in available disk space in a host file system in the mobile computing device, wherein an image file for the guest system in the mobile computing device is stored in the host file system;
   in response to the detected decrease, issuing a request for increasing a virtual size of a balloon file in a guest file system of the guest system such that a ratio of the virtual balloon file size to an amount of host physical storage space occupied by applications or components in the host file system, other than space allocated to the guest system, is maintained equal to or more than one to one without increasing an actual size of the balloon file; and
   at the host system, in response to the increased virtual size of the balloon file, detecting data blocks that are written with a predetermined content by the guest system in response to a communication from the guest system regarding the data blocks being written with the predetermined content and freeing a host physical storage associated with the detected data blocks by storing a metadata record to indicate that the host physical storage associated with the detected data blocks contains the predetermined content without writing the predetermined content onto the host physical storage, thereby causing a size of the image file for the guest system to be reduced.

2. The method of claim 1, wherein the predetermined content is a zero value.

3. The method of claim 1, wherein the communication causes garbage collection in the host file system to eliminate extent allocations.

4. The method of claim 1, further comprising increasing the virtual size of the balloon file beyond a threshold ratio of the balloon file size to occupied host disk space.

5. The method of claim 1, further comprising increasing the virtual size of the balloon file without initialization of one or more additional file blocks.

6. The method of claim 1, further comprising:
   detecting an increase in available disk space in the host file system; and
   in response to the increase, reducing the virtual size of the balloon file in the guest file system.

7. The method of claim 1, wherein the host file system resides on an SD card.

8. The method of claim 1, wherein the mobile computing device is a mobile phone with telephony support in the host system.

9. The method of claim 1, wherein the communication from the guest system comprises a discard command to free physical blocks associated with deleted guest files.

10. The method of claim 1, wherein in response to the detected decrease, issuing the request for increasing the virtual size of the balloon file in the guest file system of the guest system comprises in response to the detected decrease, issuing the request for increasing the virtual size of the balloon file in the guest file system of the guest system such that the ratio of the balloon file size to the amount of host physical storage space occupied by applications or components in the host file system other than the guest system is gradually increased as the available host physical storage space drops to a threshold level.

11. A computing system for managing storage space in a mobile computing device having a host system and a guest system that share storage resources, the system comprising:
one or more processors,
a non-transitory computer-readable medium coupled to the one or more processors having instructions stored thereon that, when executed by the one or more processors, cause the one or more processors to perform operations comprising:
detecting a decrease in available disk space in a host file system in the mobile computing device, wherein an image file for the guest system in the mobile computing device is stored in the host file system;
in response to the detected decrease, issuing a request for increasing a virtual size of a balloon file in a guest file system of the guest system such that a ratio of the virtual balloon file size to an amount of host physical storage space occupied by applications or components in the host file system, other than space allocated to the guest system, is maintained equal to or more than one to one without increasing an actual size of the balloon file; and
at the host system, in response to the increased virtual size of the balloon file, detecting data blocks that are written with a predetermined content by the guest system in response to a communication from the guest system regarding the data blocks being written with the predetermined content and freeing a host physical storage associated with the detected data blocks by storing a metadata record to indicate that the host physical storage associated with the detected data blocks contains the predetermined content without writing the predetermined content onto the host physical storage, thereby causing a size of the image file for the guest system to be reduced.

12. The system of claim 11, wherein the predetermined content is a zero value.

13. The system of claim 11, wherein the communication causes garbage collection in the host file system to eliminate extent allocations.

14. The system of claim 11, wherein the non-transitory computer-readable storage medium stores additional instructions that, when executed, cause the one or more processors to perform additional steps comprising increasing the virtual size of the balloon file beyond a threshold ratio of the balloon file size to occupied host disk space.

15. The system of claim 11, wherein the non-transitory computer-readable storage medium stores additional instructions that, when executed, cause the one or more processors to perform additional steps comprising increasing the virtual size of the balloon file without initialization of one or more additional file blocks.

16. The system of claim 11, wherein the non-transitory computer-readable storage medium stores additional instructions that, when executed, cause the one or more processors to perform additional steps comprising:
detecting an increase in available disk space in the host file system;
in response to the increase, reducing the virtual size of the balloon file in the guest file system.

17. The system of claim 11, wherein the host file system resides on an SD card.

18. The system of claim 11, wherein the mobile computing device is a mobile phone with telephony support in the host system.

19. A non-transitory computer-readable storage medium storing instructions that when executed by a computer cause the computer to perform a method for managing storage space in a mobile computing device having a host system and a guest system that share storage resources, the method comprising:
detecting a decrease in available disk space in a host file system in the mobile computing device, wherein an image file for the guest system in the mobile computing device is stored in the host file system;
in response to the detected decrease, issuing a request for increasing a virtual size of a balloon file in a guest file system of the guest system such that a ratio of the virtual balloon file size to an amount of host physical storage space occupied by applications or components in the host file system, other than space allocated to the guest system, is maintained equal to or more than one to one without increasing an actual size of the balloon file; and
at the host system, in response to the increased virtual size of the balloon file, detecting data blocks that are written with a predetermined content by the guest system in response to a communication from the guest system regarding the data blocks being written with the predetermined content and freeing a host physical storage associated with the detected data blocks by storing a metadata record to indicate that the host physical storage associated with the detected data blocks contains the predetermined content without writing the predetermined content onto the host physical storage, thereby causing a size of the image file for the guest system to be reduced.

20. The non-transitory computer-readable storage medium of claim 19, wherein the predetermined content is a zero value.

* * * * *